United States Patent Office 3,299,836
Patented Jan. 24, 1967

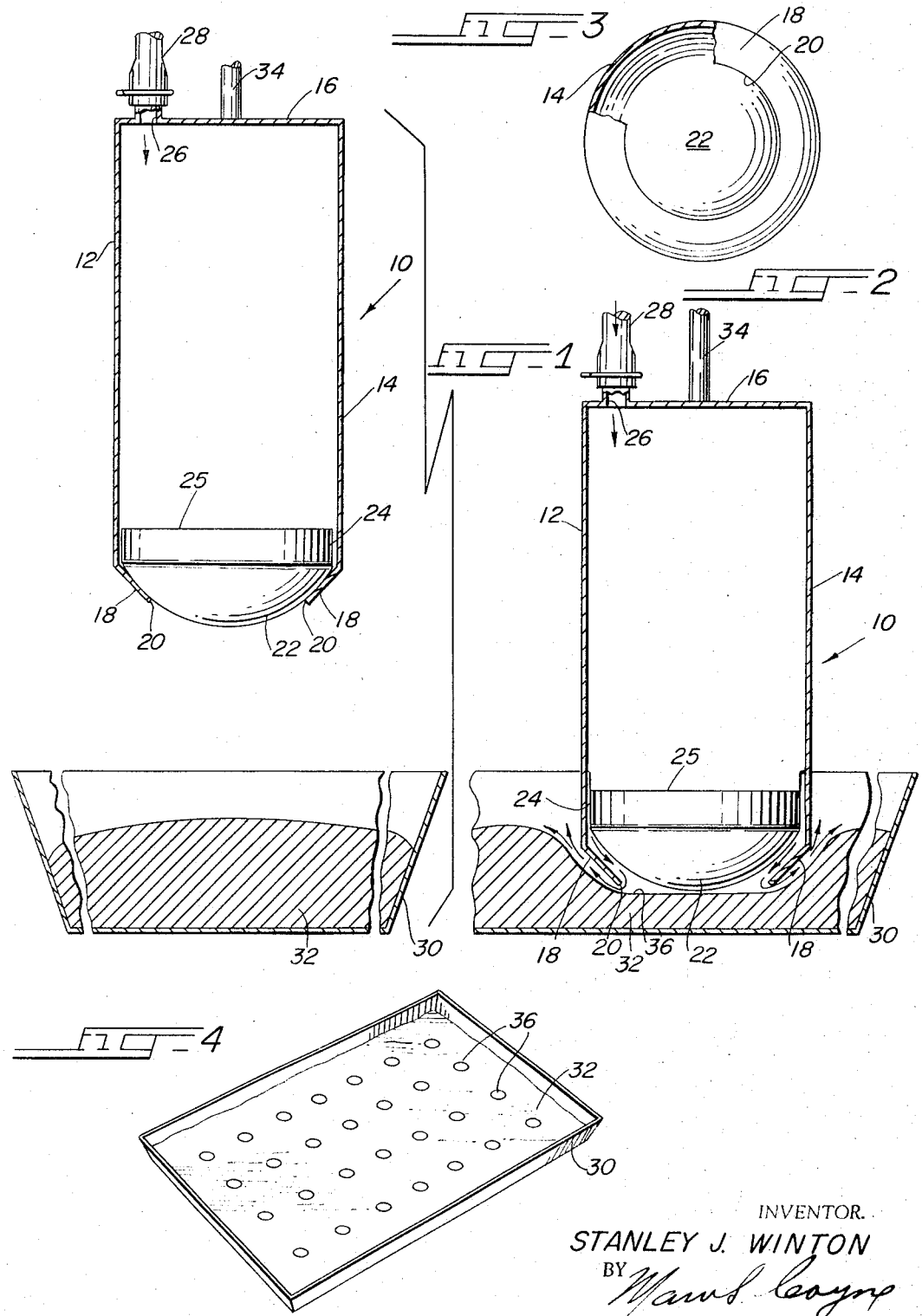

3,299,836
TAMPING DEVICE
Stanley J. Winton, Wilmette, Ill., assignor to Kitchens of Sara Lee, Inc., Chicago, Ill., a corporation of Maryland
Filed Apr. 6, 1964, Ser. No. 357,708
1 Claim. (Cl. 107—7)

This invention relates generally to tamping devices and more particularly to a tamping device for use in forming depressions or indentations in a plastic material such as dough.

It is frequently desirable or necessary to form depressions or indentations in the dough of various bakery products either for purely visual purposes or for the subsequent accommodation therein of other materials such as fruits, jellies, and the like. Those versed in the art will appreciate that unbaked dough comprises a plastic mass which has a tendency to cling or adhere to any body coming into contact therewith. Thus, one of the problems heretofore encountered with tamping devices of the type under consideration was the clinging of the sheet or piece of dough to the device. This clinging effect frequently resulted in inconsistencies or actual tearing of the dough. Accordingly, there has existed a need for a tamping device which has means for insuring that the dough does not cling or adhere thereto when the device is withdrawn.

It is therefore an important object of this invention to provide a tamping device which overcomes all of the problems described hereinabove.

Another object of the invention is to afford a tamping device for forming impressions in plastic materials such as dough and having means for insuring that the material does not cling to the device when the latter is withdrawn from contact with the material.

A further object is to provide a tamping device of the character described in which said means are automatic or self-stripping, and comprise the delivery of a stream of air under pressure at the point of contact between the device and the material. A related object is to provide such a tamping device in which said means additionally functions to automatically self-clean the device.

Still another object is to provide a tamping device of the character described which operates with a gentle action and consequently results in little working of the dough piece, a most desirable and important quality factor in yeast raised dougs.

Yet another object is to afford a tamping device of the character described which is of extremely simple construction and yet is vertually foolproof in operation and most efficient for the purposes intended.

In accordance with the foregoing, a preferred embodiment of the invention briefly comprises a hollow cylindrical body having a closed top wall and a tapering bottom wall which converges to afford an annular bottom opening or seat. A tamping tip is positioned within the cylindrical body, and the tip is of generally hemi-spherical configuration so that the same seats itself on the bottom wall of the body with a portion thereof depending from the annular opening. The maximum diameter of the tamping tip is slightly smaller than the internal diameter of the body so that the tip is free to move upwardly therein. Compressed air is admitted to the body and exerts a pressure on the tip to normally maintain the same in the seated airtight condition. When the device is brought into contact with a mass of dough, the body and tip function to make an impression therein. However, when the dough offers sufficient resistance to overcome the air pressure acting on the tip, the tip is forced upwardly into the body and out of the seated condition. The compressed air stream thereupon is directed against the dough to strip the same from the device thereby permitting the ready withdrawal thereof.

Referring to the drawings in which the same characters of reference are employed to indicate corresponding or similar parts throughout the several figures of the drawings:

FIG. 1 is a vertical cross-sectional view, partly in elevation, of a tamping device embodying the principles of the invention and showing the same positioned above a dough-filled pan;

FIG. 2 is a similar view showing the position of the tamping tip after the device has been brought into contact with the dough and made an impression therein;

FIG. 3 is a bottom plan view with portions being broken away to show the relationship of parts; and FIG. 4 is a perspective view of the dough-filled pan after a plurality of indentations or depressions have been formed therein.

Referring more particularly to the various figures of the drawings, the reference numeral 10 indicates generally a tamping device embodying the principles of the invention. The device 10 comprises a tubular body 12 which may be of cylindrical configuration as indicated. The body 12 thus comprises a vertical wall 14 and is closed at one end thereof by a top wall such as 16. A tapering skirt or bottom wall 18 projects downwardly from the opposite end of the vertical wall 14 and converges to afford an annular bottom opening or seat 20.

Positioned within the body 12 is freely movable valve member-tamping tip 22 which may be of generally hemisyherical configuration as indicated in FIGS, 1, 2 and 3. In order to permit free movement of the tip 22 within the body 12, the tip includes an upper vertical walled segment 24 and a top wall 25 which are of smaller diameter than the inner diameter of the body. It will thus be appreciated that when the device 10 is vertically oriented as in FIG. 1 of the drawings, the tip 22 will seat itself in the seat 20 and cooperate with the bottom wall 18 to provide an airtight seal at the bottom of the body 12. It will of course be noted that a portion of the tip 22 depends below the bottom wall 18 when the tip is in the seated condition.

Means is provided for admitting air under pressure into the body 12, and in the embodiment illustrated comprises an inlet opening 26 formed in top wall 16 to which is operatively connected a suitable air delivery line such as 28. It will thus be noted that when the device 10 is operationally positioned about a pan 30 containing dough 32, the stream of air entering the body 12 acts against the top wall 25 of the tip 22 to further aid in maintaining the tip in the seated airtight condition.

Suitable drive means (not shown) are provided for reciprocating the device 10 into engagement with the dough 32, and for this purpose a shaft 34 may be secured to the top wall 16 and connected to said drive means.

The operation of the device 10 may now be described in the following manner. When the dough-filled pan 30 is properly positioned beneath the device 10 (as in FIG. 1), the body 12 is moved downwardly by the drive means until the tip 22 engages the top surface of the dough 32. Since the initial resistance of the dough 32 is insufficient to overcome the air pressure above the tip 22, the continued downward motion of the device causes the tip 22 and bottom wall 18 to compress the dough and form a depression or indentaton such as 36 therein (see FIGS. 2 and 4). After formation of the predetermined depth indentation 36, the compressed dough offers sufficient resistance to overcome air pressure within the body 12, said air pressure typically being on the order of five pounds per square inch. As a result, the tip 22 is forced upwardly into the body 12 so that the air flows around the tip and out of the body through the opening 20, as indicated by the arrows in FIG. 2. This stream of air pushes against the dough 32 to automatically strip the same away from the tip 22 and bottom wall 18 so that the device may now be readily withdrawn without any dough clinging thereto.

The additional function of the discharging air stream as a self-cleaning means should likewise be noted. It will thus be appreciated that materials such as flour, sugar and the like, which might otherwise tend to accumulate or agglomerate on the tamping device are automatically blown away. Auxiliary cleaning devices and down time necessitated by such auxiliary cleaning operations are thereby virtually eliminated.

From the foregoing description and drawings, it should be apparent that I have provided a novel tamping device for making indentations in plastic masses such as dough. Operation of the simple construction is virtually foolproof and insures against al clinging of the plastic mass to the device as the same is withdrawn. A plurality of devices 10 may be employed, or suitable means may be provided to furnish relative movement between the pan 30 and the device, in order to achieve the pattern of indentations 36 illustrated in FIG. 4. Moreover, by regulating the air pressure in the body 12 or even supplementing said pressure with fixed springs positioned within the body, the type of indentation formed may be adjusted as desired.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claim.

What I claim and desire to secure by Letters Patent of the United States is:

A tamping device for a sheet of dough or the like comprising:

an elongated cylinder having a closed top wall and a tapering bottom wall, said bottom wall converging to afford an annular seat and a reduced diameter annular bottom opening, a generally hemi-spherical valve-tamping member loosely positioned in said cylinder and having a maximum diameter greater than the diameter of said bottom opening but smaller than the internal diameter of said cylinder, said seat accommodating said member therein so that portions thereof project out of said bottom opening to provide an airtight seal thereof, said top wall being formed with a gas inlet therein, means communicating with said gas inlet for admitting gas under pressure into said cylinder to yieldably urge said member into airtight seating engagement, and means for reciprocating said device into contact with said sheet for forming an impression therein, said gas flowing out through said bottom opening when the contact pressure exceeds the pressure of the gas in said cylinder whereby the flow of said gas breaks the clinging bond between said sheet and said tamping device and simultaneously cleans said bottom wall and said member of adhering particles.

References Cited by the Examiner

UNITED STATES PATENTS

| 2,415,976 | 2/1947 | Thorud | 107—47 |
| 2,515,952 | 7/1950 | Doyle | 107—47 |
| 2,918,183 | 12/1959 | Petersen et al. | |
| 3,190,758 | 6/1965 | Hauf | 107—54.28 |

FOREIGN PATENTS

| 1,339,280 | 8/1963 | France. |
| 196,951 | 4/1923 | Great Britain. |
| 201,053 | 7/1923 | Great Britain. |

WALTER A. SCHEEL, *Primary Examiner.*

R. W. JENKINS, *Assistant Examiner.*